US012110259B2

(12) United States Patent  
Carragher

(10) Patent No.: US 12,110,259 B2  
(45) Date of Patent: Oct. 8, 2024

(54) CHEMICAL HEAT SOURCES FOR USE IN DOWN-HOLE OPERATIONS

(71) Applicant: BiSN Tec Ltd, Warrington (GB)

(72) Inventor: Paul Carragher, Lymm (GB)

(73) Assignee: BiSN Tec Ltd., Warrington (GB)

( * ) Notice: Subject to any disclaimer, the term of this patent is extended or adjusted under 35 U.S.C. 154(b) by 1255 days.

(21) Appl. No.: 16/095,928

(22) PCT Filed: May 5, 2017

(86) PCT No.: PCT/GB2017/051262  
§ 371 (c)(1),  
(2) Date: Oct. 23, 2018

(87) PCT Pub. No.: WO2017/191471  
PCT Pub. Date: Nov. 9, 2017

(65) Prior Publication Data  
US 2019/0144355 A1 May 16, 2019

(30) Foreign Application Priority Data  
May 6, 2016 (GB) .................................. 1607912.1  
Mar. 30, 2017 (GB) .................................. 1705149.1

(51) Int. Cl.  
*C06B 45/14* (2006.01)  
*C06B 21/00* (2006.01)  
*E21B 33/134* (2006.01)  
*E21B 36/00* (2006.01)

(52) U.S. Cl.  
CPC .......... *C06B 45/14* (2013.01); *C06B 21/0041* (2013.01); *E21B 33/134* (2013.01); *E21B 36/00* (2013.01); *E21B 36/008* (2013.01)

(58) Field of Classification Search  
CPC ..................................................... C06B 45/14  
See application file for complete search history.

(56) References Cited

U.S. PATENT DOCUMENTS

| 1,534,229 | A |   | 4/1925 | Livergood |
|-----------|---|---|--------|-----------|
| 2,686,689 | A |   | 8/1954 | Douglas |
| 2,764,494 | A | * | 9/1956 | Albert .................... D21H 17/68 501/118 |
| 2,789,004 | A |   | 4/1957 | Forster |
| 2,822,876 | A |   | 2/1958 | Murrow |

(Continued)

FOREIGN PATENT DOCUMENTS

| CA | 2592556 | 6/2007 |
| EP | 1 933 004 | 6/2008 |

(Continued)

*Primary Examiner* — Aileen B Felton

(57) ABSTRACT

A chemical reaction heat source for use in heaters for downhole applications is provided. The heat source has a solid fuel composition that comprises thermite and a binding agent. The binding agent serving to maintain the solid form of the solid fuel composition during burning and ensure a predetermined uniform heating pattern can be provided for longer. The solid fuel composition can be provided in the form of blocks. The solid fuel composition can also be provided in the form of a plurality of fragments that, during burning, behave more like powdered thermite and have the ability to flow.

8 Claims, 3 Drawing Sheets

(56) References Cited

U.S. PATENT DOCUMENTS

| | | | |
|---|---|---|---|
| 2,906,094 A * | 9/1959 | Damon | F42B 3/10 60/39.47 |
| 3,119,451 A | 1/1964 | Hall | |
| 3,170,516 A | 2/1965 | Corley | |
| 3,208,530 A | 9/1965 | Allen | |
| 3,871,315 A | 3/1975 | Anderson | |
| 4,134,452 A | 1/1979 | Kingelin | |
| 4,423,783 A | 1/1984 | Haag | |
| 4,488,747 A | 12/1984 | Austin | |
| 4,523,640 A | 6/1985 | Wilson | |
| 4,696,343 A | 9/1987 | Anderson | |
| 5,052,489 A | 10/1991 | Carisella | |
| 5,564,861 A | 10/1996 | Khudenko | |
| 6,102,120 A | 8/2000 | Chen | |
| 6,454,001 B1 | 9/2002 | Thompson | |
| 6,474,414 B1 | 11/2002 | Gonzalez | |
| 6,664,522 B2 | 12/2003 | Spencer | |
| 6,828,531 B2 | 12/2004 | Spencer | |
| 6,923,263 B2 | 8/2005 | Edin | |
| 7,152,657 B2 | 12/2006 | Bosma | |
| 7,290,609 B2 | 11/2007 | Wardlaw | |
| 2002/0162596 A1 | 4/2002 | Simpson | |
| 2002/0056553 A1 | 5/2002 | Duhon | |
| 2003/0132224 A1 | 7/2003 | Spencer | |
| 2004/0261994 A1 | 12/2004 | Nguyen | |
| 2005/0109511 A1 | 5/2005 | Spencer | |
| 2006/0144591 A1 | 7/2006 | Gonzalez | |
| 2007/0051514 A1 | 3/2007 | La Rovere | |
| 2010/0006289 A1 | 1/2010 | Spencer | |
| 2010/0263876 A1 | 10/2010 | Frazier | |
| 2011/0132223 A1 | 6/2011 | Streibich | |
| 2011/0146519 A1 | 6/2011 | Han | |
| 2011/0174484 A1 | 7/2011 | Wright | |
| 2011/0214855 A1 | 9/2011 | Hart | |
| 2012/0186543 A1 * | 7/2012 | Lohr, Sr. | C01B 3/10 123/3 |
| 2012/0199351 A1 | 8/2012 | Roberston | |
| 2012/0298359 A1 | 11/2012 | Eden | |
| 2013/0087335 A1 | 4/2013 | Carraher | |
| 2013/0192833 A1 | 8/2013 | Gano | |
| 2014/0318782 A1 | 10/2014 | Bourque | |
| 2015/0211326 A1 | 7/2015 | Lowry | |
| 2015/0211327 A1 | 7/2015 | Lowry | |
| 2015/0211328 A1 | 7/2015 | Lowry | |
| 2015/0345248 A1 | 12/2015 | Carragher | |
| 2015/0368542 A1 | 12/2015 | Carragher | |
| 2016/0145962 A1 | 5/2016 | Carragher | |
| 2016/0319633 A1 | 11/2016 | Cooper | |
| 2017/0030162 A1 | 2/2017 | Carragher | |
| 2017/0089168 A1 | 3/2017 | Carragher | |
| 2017/0226819 A1 | 8/2017 | Carragher | |
| 2017/0234093 A1 | 8/2017 | Carragher | |
| 2017/0234100 A1 | 8/2017 | Carragher | |
| 2017/0306717 A1 | 10/2017 | Carragher | |

FOREIGN PATENT DOCUMENTS

| | | |
|---|---|---|
| GB | 2016063 | 9/1979 |
| GB | 2 164 886 | 4/1986 |
| WO | WO 2011/151171 | 12/2011 |
| WO | WO 2013/066340 | 5/2013 |

* cited by examiner

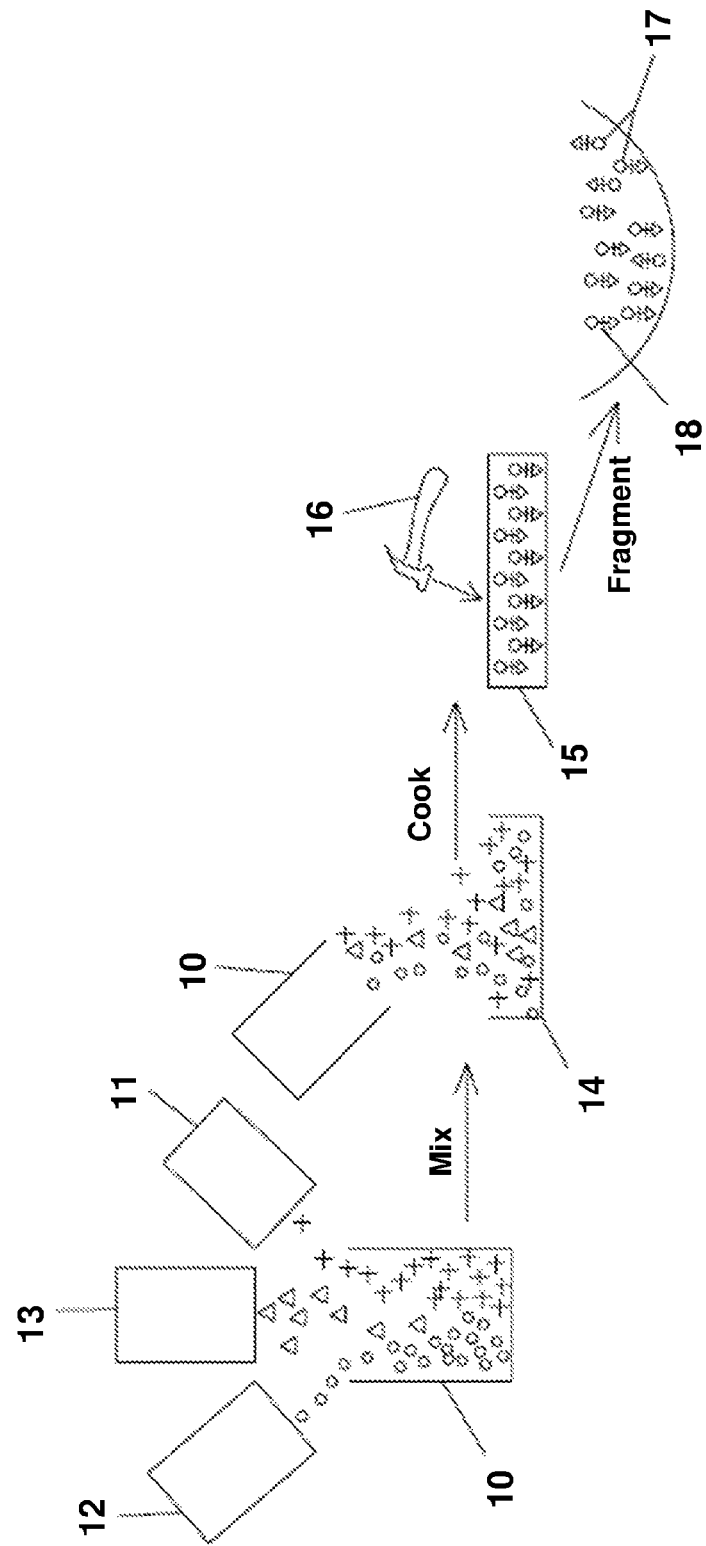

CHEMICAL HEAT SOURCES FOR USE IN DOWN-HOLE OPERATIONS

This application claims priority under 35 USC 371 to International Application No. PCT/GB2017/051262, filed May 5, 2017, which application claims priority to application serial no. GB 1607912.1 (filed May 6, 2016) and application serial no. GB 1705149.1 (filed Mar. 30, 2017), the entire disclosure of each of which is incorporated herein by reference.

FIELD OF THE INVENTION

The present invention relates to the underground operations carried out down holes and in other underground conduits such as wells, and in particular oil and gas wells. More particularly, the present invention relates to chemical heat sources for use in down-hole operations; examples of which include the plugging and sealing of wells.

BACKGROUND OF THE INVENTION

When a well, such as an oil or gas well, is at the end of its useful life it is usually abandoned. From time to time the operation of these wells may also be suspended for reasons such as low oil prices, "workovers" and other unexpected events that necessitate the temporary suspension of a well (e.g. approaching storms or hurricanes). However, before a well can be abandoned/suspended the well must be "plugged" to ensure that potentially hazardous materials, such as hydrocarbons, cannot escape the well.

In the past, various methods have been employed to plug abandoned wells. One such known method involves pouring cement or resin into a well so as to fill a length of the well. However the use of cement/resin has proven to be unreliable and vulnerable to leaking. This can lead to previously abandoned wells being subsequently re-plugged at considerable additional expense.

In view of the limitations of using cement/resin to plug wells, an alternative approach was developed which uses eutectic alloys, such as bismuth-containing alloys, to form a seal within the well. This approach, which is described in detail in CA 2592556 and U.S. Pat. No. 6,923,263, utilises the ability of these alloys to contract upon melting and expand again when they re-solidify. Essentially the alloy is deployed into a well; heated until it melts and "slumps"; and then allowed to cool, whereby the alloy expands to form a tight seal with the walls of the well.

The use of eutectic alloys, such as bismuth-containing alloys, to plug wells or repair existing plugs in wells is described in: U.S. Pat. Nos. 7,290,609; 7,152,657; US 2006/0144591; U.S. Pat. Nos. 6,828,531; 6,664,522; 6,474,414; and US 2005/0109511.

International PCT application WO2011/151271 describes a number of improvements relating to methods and apparatus for use in well abandonment.

The heating of eutectic alloy (e.g. bismuth-based alloy) plugs can be achieved by electrical or chemical means. International PCT application WO2014/096857 describes chemical reaction heat sources for use in heaters for down-hole applications, such as the heating of eutectic alloy plugs. The chemical reaction heat sources described in this earlier document employ a fuel composition that combines thermite with a damping agent that tempers the speed and heat with which the thermite burns.

SUMMARY OF THE INVENTION

The present invention relates to further improvements in the chemical reaction heaters for use in down-hole operations which include, amongst other things, well abandonment and well suspension.

In particular, the improvements are applicable to the heaters used in down-hole operations that include, but are not limited to, the deployment and retrieval of plugs from underground conduits, such as well casings. However, it is envisaged that the heaters of the present invention can be employed in a wide range of other down-hole operations without departing from the scope of the present invention.

The present invention provides a chemical reaction heat source for use in heaters for down-hole applications, said heat source having a solid fuel composition; and wherein the fuel composition comprises thermite and one or more binding agents that maintain the solid form of the solid fuel composition during burning.

Preferably said binding agents make up between about 5-35% by weight of the fuel composition.

Basic thermite is a mixture of iron oxide ($Fe_2O_3$) and aluminium powder. When it is ignited the aluminium powder reacts with the oxygen in the iron oxide in a highly exothermic reaction that gives off a large amount of heat and produces molten iron. As a consequence, during burning thermite tends to flow like a liquid. It is appreciated that other thermite mixtures (such as cupric oxide and aluminium powder) behave in a similar way and thus can be employed to achieve the same technical effect.

In some applications this flow of the thermite is desirable because it leads to the formation of 'hot spots' which focus the heat of the reaction. However it has now been discovered that in some down-hole applications, such as operations in substantially horizontal wells for example, this state change is unhelpful because the flow of the thermite leads to an uneven distribution of heat, which in turn can be detrimental to the quality of the plug formed by the alloy.

It is has been discovered that by adding one or more binding agents to thermite in the solid fuel composition of the chemical reaction heat source of the present invention the tendency of the thermite to flow during burning is reduced. This helps retain a consistent heat distribution pattern for longer. Examples of suitable binding agents include sodium silicate and magnesite; of which varieties include dead burn magnesite, light burn magnesite and caustic calcined magnesite.

It is envisaged that the facility to retain a consistent heat distribution for extended periods of time enables the chemical heaters of the present invention to perform in a manner more akin to electrical heaters (i.e. uniform heating), but without their technical limitations. In particular, electrical heaters suffer noticeable voltage drops when the length of cable used is too long—as is necessarily the case with deep hole deployment—which leads to longer heating periods and a reduction in heat produced.

These improved heating capabilities make the heaters of the present invention particularly suitable for a range of down-hole operations such as: well plugging; squeezing off; the fitting and repair of annulus packers; the maintenance and repair of sand filters; and the maintenance and repair of open hole gravel packs (OHGPs).

Preferably the solid fuel composition used in the chemical reaction heat source may be provided as one or more solid blocks. It is appreciated that providing the solid fuel composition in blocks provides flexibility, not only during storage and transport but also when it comes to constructing a heater that is tailored for a particular down-hole application.

Preferably at least one of the solid blocks of fuel composition may further comprise a damping agent. It is appreciated that adjusting the proportions of damping agent to thermite in a fuel composition block can cool the standard thermite reaction down from 2,500° C. (0% damping agent) to around 600° C. (30% damping agent).

Suitable examples of damping agents include sand, graphite, and carbon flakes or pellets. It is also envisaged that magnesite can be used as both a binding agent and a damping agent when it is used in combination with another binding agent, such as sodium silicate.

Further preferably the ratio of thermite to damping agent employed in the fuel composition may be varied from solid block to solid block.

It is envisaged that providing a range of fuel composition blocks will enable the blocks to be placed in different arrangements so as to achieve different heating patterns that tailor the heater to the particular task the heater is required to perform.

For example, arranging the blocks with higher proportions of thermite at one end of the heat source will ensure that one end of the heat source generates more heat than the other end. This enables heat to be directed appropriately depending upon whether a heater is deploying a plug or retrieving a plug.

The introduction of a damping agent into a fuel composition block causes the block to burn more slowly and with less heat, which is generally desirable. However in some situations it can cause problems. For instance, in the case of heaters that employ one or more fuel composition blocks of an increased length, this damping affect can also delay the burning of the block regions that are furthest away from the ignition point. This can lead to an uneven heat distribution.

In order to address the problem of uneven heat distribution, preferably one or more of the fuel composition blocks may be provided with a conduit running there through. In this way the heat generated at the ignition point can be transmitted more quickly than would otherwise be the case—due to the damping affect—to the further regions of the block. In this way a more uniform burning of the fuel composition block can be achieved.

The conduit may take the form of one or more bores/holes running from one end of the block to an opposite end of the block. However alternative forms of conduit may be employed without departing from the present invention.

Further preferably the conduit of the block may receive a wicking fuel composition that burns quicker and/or hotter than the solid fuel composition of the block within which the conduit is provided. It is understood that by providing a region of fuel composition that burns hotter/quicker than the rest of the block the chemical reaction of the entire block can be triggered much more quickly than would be the case if no wicking action was employed.

Alternatively, or additionally, at least one of the solid fuel composition blocks might be provided with an outer layer of a wicking fuel composition that burns quicker and/or hotter than the sold fuel composition. As with the wicking fuel composition received within the conduit it is envisaged that the outer layer will speed up the chemical reaction of the entire block rather than waiting for the chemical reaction to travel naturally away from the ignition point.

Preferably the chemical reaction heat source may comprise a plurality of solid fuel composition blocks that are configured to be stacked one on top of another. In this way the length and heat distribution pattern of a heater can be designed with a particular down-hole application in mind.

Preferably the solid fuel composition may be provided with an outer layer of an oxidising agent.

Although the components that make up the fuel composition (i.e. the thermite, binding agent, and damping agent) play a key role in determining the burn characteristics of the composition (i.e. the speed and heat with which it burns), other contributory factors have also be identified.

One such factor is the shape of the blocks in to which the fuel composition is formed. In this regard, it is noted that blocks having a cylindrical shape are considered more preferable to cubic and cuboid shapes because cylinders burn more evenly.

In view of this, the fuel composition blocks of the present invention are preferably cylindrical in shape.

Also, in the case of cylindrical shaped blocks, in particular, it has been noted that increasing the diameter of blocks, whilst keeping the same fuel composition, results in a faster burn rate.

As a result it is envisioned that in cases where different sized heaters are required to deliver the same burn rate it will be necessary to adjust the ratio of binding agent and/or damping agent to thermite. That is to say, when the diameter is increased the ratio of binding/damping agent to thermite needs to be increased too in order to retain the same burn rate.

It has also been discovered that the higher the level of porosity a fuel composition block has the quicker the burn rate. That is to say the more densely packed a fuel composition block is the slower the block burns.

Factors that affect the density of a fuel composition block include the grain size of the thermite in the mixture and also the extent to which the mixture has been compressed in order to form the block.

As detailed above, providing the composition of the chemical reaction heat source in the form of one or more blocks has a range of benefits. One such benefit is the reduction of the extent to which the thermite flows during burning.

However, it is appreciated that in some situations it is highly desirable for the thermite to flow during burning. Typically this might be achieved by simply adopting fuel composition comprising thermite in a powdered form. However, this can present a problem when the fuel composition is formed from a mixture of thermite and an additive such as a damping agent, for example.

In particular it will be appreciated that fuel compositions that are formed from a mixture of two components (i.e. thermite and a damping agent) may, despite being thoroughly mixed initially, separate out over time and/or during transportation of the fuel composition.

As a result, when a heater with the disturbed fuel composition is finally used, the rate of burn may no longer be what was originally intended. For instance the fuel composition may burn hot then cold then hot again as the reaction consumes inconsistently mixed thermite/damping agent.

In view of this the present invention provides for a fuel composition that retains the flowability during burning of the powdered form, while also maintaining a more consistent burn rate. In this regard the solid fuel composition of the present invention may preferably be broken into a plurality of fragments. This fragmented solid fuel composition will hereinafter also be referred to as fuel composition 'crumble'.

By providing the solid fuel composition in the form of a plurality of fragments, rather than solid blocks, it is possible to achieve a more consistent burn rate throughout the fuel composition while at the same time delivering much greater flowability of the thermite (i.e. more like powdered fuel composition).

This is made possible because the fragments, which are formed from a solid block or sheet of fuel composition baked/cooked in accordance with the present invention, essentially form reactive clusters that comprise the various component parts of the fuel composition (i.e. thermite/damping agent/binding agent).

It will be appreciated that because each reactive cluster (i.e. fragment) has the required combination of thermite and damping agent, for example, they burn with a consistent rate across the entire batch even after the fragments are disturbed and/or allowed to settle. This is in contrast to a powdered fuel composition which, it will be appreciated, would tend to separate out in to the various components in an inconsistent manner.

Although not essential, the solid fuel composition that is used to form the fuel composition 'crumble' may preferably also comprise one or more damping agents. In this way the burn rate of the 'crumble' can be varied in accordance with the other embodiments of the present invention.

In the light of the above discoveries, the present invention also provides a method of manufacturing a chemical heater suitable for use in down hole operations, said method comprising: preparing a fuel composition comprising one or more binding agents and thermite; forming the fuel composition in to one or more blocks; inserting the blocks in a heater body.

Preferably the step of forming the fuel composition in to one or more blocks comprises putting the mixture into one or more moulds.

Preferably the step of forming the fuel composition in to one or more blocks may comprise freezing said moulded block; removing the blocks from said moulds and heating said blocks. Freezing the fuel composition ensures that the blocks retain their shape during the manufacturing/baking process without the need to bake the mixture in a mould.

Alternatively the step of forming the fuel composition in to one or more blocks may comprise heating the blocks within said moulds. That is to say, the blocks are not removed from their moulds until after they have been 'cooked'.

Preferably the fuel composition further comprises a damping agent.

Preferably the fuel composition is compressed to form said one or more blocks.

Preferably the fuel composition blocks are cylindrical in shape and have a predefined diameter.

Preferably the ratio of binding agent and/or damping agent to thermite is increased in line with an increase in the predefined diameter of the blocks so as to achieve a consistent burn rate.

Preferably the density of the fuel composition blocks is increased to reduce the burn rate provided by the heater. Alternatively the density of the fuel composition blocks is decreased to increase the burn rate provided by the heater.

Further preferably the density is increased by reducing the grain size of the thermite used in the fuel composition and decreased by increasing the grain size of the thermite (i.e. making the thermite more coarse).

Additionally, or alternatively, the density of the fuel composition blocks is controlled by the extent to which the fuel composition is compressed during the formation of the blocks.

In a further aspect of the present invention there is provided a method of manufacturing a chemical reaction heat source for use in heaters for down-hole applications, said method comprising: preparing a solid fuel composition that comprises thermite and one or more binding agents that maintain the solid form of the solid fuel composition during burning; shaping the mixture into a sheet or block; heating the shaped mixture to solidify the shaped mixture; and breaking the shaped mixture into a plurality of fragments to form the chemical reaction heat source.

It is envisaged that the shaped mixture may be broken into a plurality of fragments by applying impact force to smash or shatter the shaped mixture. Alternatively the shaped mixture may be mechanically chewed up into fragments. Although these are preferred methods for fragmenting the mixture, it is envisaged that a variety of suitable methods will be apparent to the skilled person. The present invention is considered to cover any suitable methods for breaking the mixture into fragments.

Preferably the solid fuel composition mixture may also comprise one or more damping agents. It will be appreciated that the examples of damping agent provided below would also be suitable for use in this this aspect of the present invention.

Preferably the solid fuel composition mixture is shaped into a sheet having a thickness of between 2 mm and 40 mm. In this way the sheet can be readily shattered into the required plurality of fragments. With that said, it is appreciated that the thickness of the sheet may be increased without departing from the general concept of the present invention.

It is envisaged that thicker sheets may be fragmented using mechanical chewing, for example, rather than the blunt force impact that would suffice for thinner sheets.

Preferably, the method may further comprise the step of filtering the fragments to ensure the final chemical reaction heat source has a restricted range of fragment sizes. In this way the extent to which the crumble operates like a powered fuel composition can be increased, whilst maintaining a consistent burn characteristic across the fragments within a particular batch.

Preferably the fragments formed may fall within a size range of 100 μm to 10 mm and further preferably between 500 μm to 6 mm.

The present invention also provides a down-hole heater comprising any of the chemical reaction heat sources described above.

BRIEF DESCRIPTION OF THE DRAWINGS

The present invention will now be described with reference to the drawings, wherein:

FIG. 3 shows a flow diagram of the steps involved in a preferred embodiment of the method of manufacturing the fuel composition 'crumble' of the present invention.

DESCRIPTION OF THE PREFERRED EMBODIMENTS

Although the present invention is considered particularly appropriate for use in plugging both vertical and non-vertical wells (with or without well casings) it is appreciated that the heaters of the present invention have characteristics which make them suitable for a range of other down-hole applications too.

For example the described aspects of the present invention can be used together with the methods and apparatus described in WO2011/151271 to facilitated the squeezing off and repairing of wells.

Further, whilst the chemical heat source of the present invention is described herein primarily in relation to its use in the plugging of oil and gas wells, it is envisaged that chemical heat source of the present invention would provide benefits when plugging other forms of underground conduits, such as water pipes for example.

In a preferred embodiment of the chemical reaction heat source 1 of the present invention the solid fuel composition is provided in the form of a stacked arrangement of blocks 2, 3 and 4 that, in use, are housed within a heater body.

In order to maintain the solidity of the blocks during burning, the fuel composition used to form each block comprises one or more binding agents as well as thermite. The role of the binding agent, preferable examples of which include sodium silicate and magnesite, is to maintain its structure, and thus a solid shape, at high temperatures so as to prevent the thermite from becoming molten and flowing like a liquid.

By maintaining the original solid shape of the fuel composition block it is possible to achieve a fixed, consistent heat distribution pattern for a longer period of time, thus achieving a more uniform heating of the eutectic alloy (e.g. Bismuth-based alloy) being used in, for example: a well plug, annulus packer or a 'squeezing off' operation.

The provision of a consistent heat distribution pattern is considered particularly advantageous in down-hole operations within substantially horizontal wells because unbound burning thermite can flow under the force of gravity and settle on the lower regions of a heater. This reduces the heat applied to any alloy in the upper regions, which can impair the plug formation process.

Preferably the binding agent/binder constitutes up to 35% by weight of the fuel composition, although amounts of binding agent can be as low as 5% in many applications.

Whilst it is envisioned that the binder may provide a damping effect to the fuel composition, in preferred embodiments of the present invention a separate damper agent (e.g. sand or magnesite) may also be added to the fuel composition.

In a preferred example, the fuel composition of the present invention comprises between 5-15% by weight sodium silicate and between 10-35% by weight of magnesite. In this composition the magnesite has a dual role as both a binding agent and a damping agent.

Figure 1:
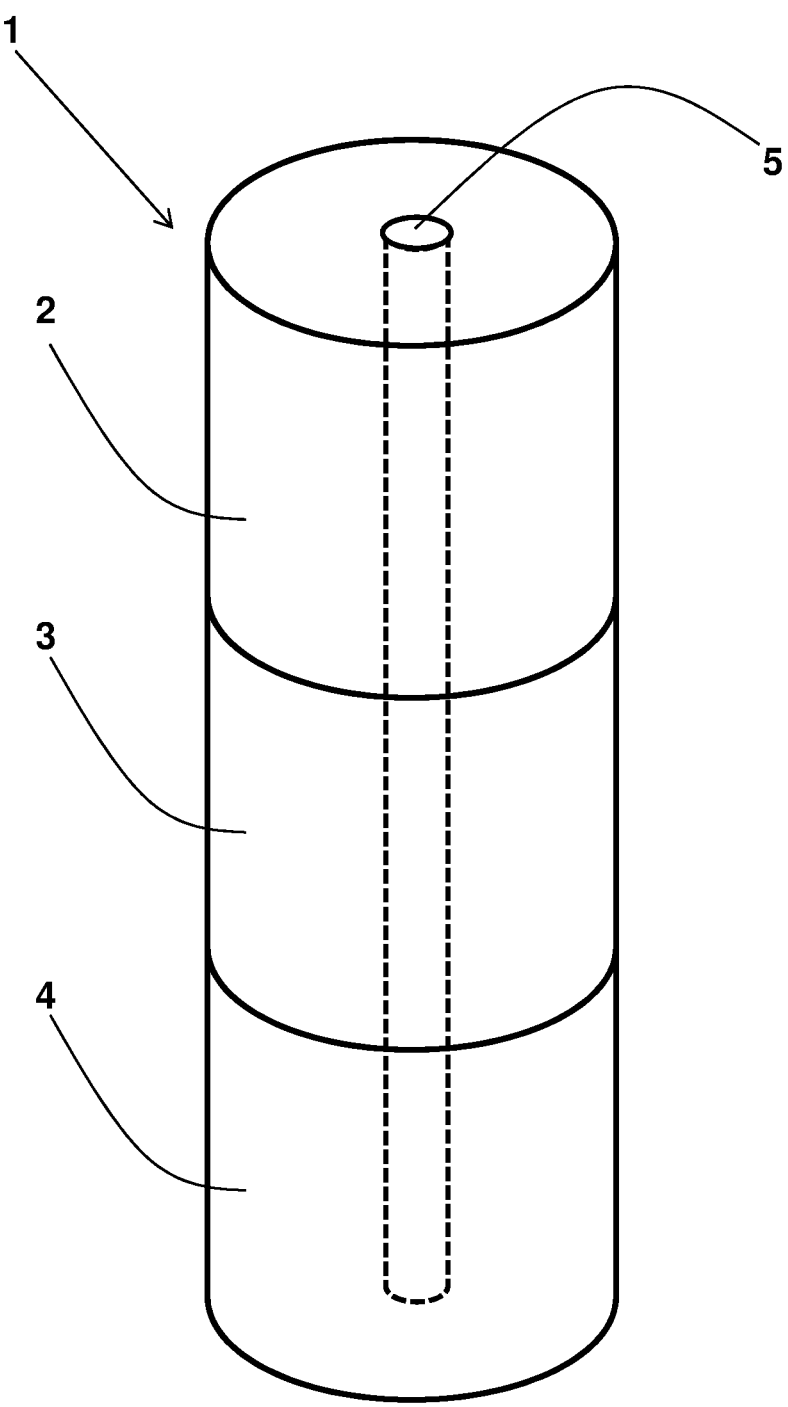
FIG. 1 shows a preferred embodiment of a chemical reaction heat source of the present invention.

It is envisaged that each of the solid fuel composition blocks 2, 3, 4 in the heat source 1 shown in FIG. 1 is capable of generating a certain level of heat, the level of which is predetermined by the ratio of thermite to damping agent (e.g. sand) in the composition mix of that particular block.

It will be appreciated that a range of predetermined mixes, which are capable of generating a range of predetermined temperatures, can be produced by varying the levels of thermite from 99% to 1% by mixing the thermite with a damping agent. The damping agents (or combustion suppressing agents as they may also be referred to herein) preferably take the form of silica or sand. However it is envisaged that alternative forms of damping agent may also be adopted without departing from the general inventive concept of the present invention.

It is appreciated that by arranging blocks with differing heating abilities in specific stacking orders it is possible to create a chemical reaction heat source that generates a heat distribution pattern appropriate to the type of heater it is being used in.

FIG. 1 shows an example of a chemical reaction heat source 1 with a block stacking arrangement that creates a distinct heating pattern.

It is appreciated that, due to the variations in damping provided from block to block, the passage of the chemical reaction (and the associated heat generation) through the heat source 1 can also be variable.

On some occasions this may be desirable, however it is envisaged that there are many occasions where a more uniform heat distribution pattern is required across the entire heat source 1. One example of which might be when dealing with a heat source of an increased length, for instance a heater that is 10-20 ft or about 3-6 metres long.

In situations where a more uniform heat distribution pattern is required it is envisaged that it is advantageous to utilise a wicking fuel composition, either on the surface of the solid fuel blocks or housed within the blocks.

Essentially the wicking fuel composition provides a quicker route for the chemical reaction/burning to spread through the blocks of a chemical reaction heat source. To this end, the wicking fuel composition necessarily burn quicker and/or hotter that the fuel composition used to form the blocks. This may mean that the wicking fuel composition is pure thermite, although it does not necessarily preclude the presence of a damping agent at a lower proportion to that used in the associated blocks.

In the preferred embodiment shown in FIG. 1 the wicking fuel composition 5 is received within a conduit that runs through the centre of the heat source 1 that is formed by the stacking of blocks 2, 3 and 4. In order to achieve a single conduit extending through the entire heat source 1 each block must be provided with a separate conduit that is in alignment with its neighbours.

It is envisaged that, although FIG. 1 only shows a single conduit running through the entire length of the stack, it may be advantageous to provide more than one conduit per block.

Figure 2:
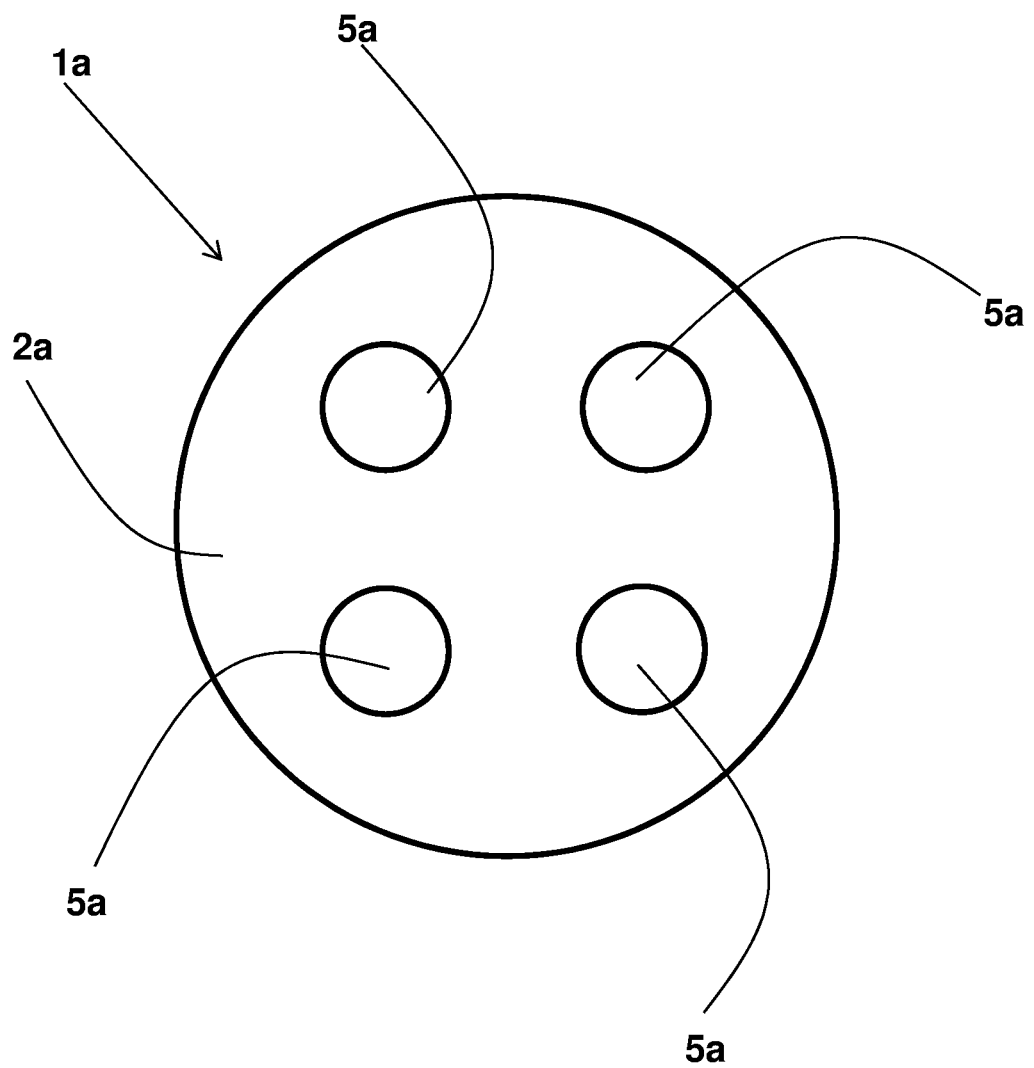
FIG. 2 shows a plan view of an alternative preferred embodiment of the present invention.

FIG. 2 shows a plan view of a heat source 1a with an alternative arrangement of conduits containing a wicking composition 5a. It is envisaged that providing a plurality of conduits in a block might be particularly desirable when the block is subject to higher damping as it would enable chemical reactions to be triggered in a number of regions of the block at the same time (i.e. rather than from the centre outwards). Such an arrangement may also be employed in blocks of a larger diameter, for example. Indeed it is envisaged that this approach can be adopted in combination with any of the other aspects of the present invention.

Although FIG. 1 shows the conduit running through the entire length of the heat source 1 it is envisaged that a conduit may not be required in every block in a stack. An example where this might be the case is where the block itself is capable of transmitting the chemical reaction/heat quickly to the next block in a stack (i.e. the block is not a substantial obstruction). This may be the case when the block is small or it is formed from a sufficiently fast/hot burning fuel composition.

Although not shown in the Figures it is also appreciated that pure thermite powder may be provided in and around the region where the igniter and the first fuel composition block come into contact. In this way the chemical reaction is given the best chance of being successfully initiated.

As mentioned above, in addition to the ingredients of the solid fuel composition block, other aspects of the block can be adjusted to alter the burn rate delivered by a given block.

For example, a cylindrical block with an outer diameter of about 5 cm (2 inches) that has 73% density would burn at approximately 2.4 seconds per cm (6 seconds per inch). However if the same mixture is used to form a cylindrical block of the same density but with an outer diameter of about 10 cm (4 inches) the burn rate increases to approximately 0.4 seconds per cm (1 second per inch).

By way of further example, if the same fuel composition mixture was used to form a cylindrical block with an outer diameter of about 5 cm (2 inches) but with a density of 60% then the block would burn at a rate of 0.4 seconds per cm (1 second per inch). However, if a similar cylindrical block was made with its density increased to 80% then the burn rate decreases to approximately 12 seconds per cm (30 seconds per inch).

It is envisioned that these observations can be used to help produce fuel composition blocks to suit a range of needs. Whether that be retaining a consistent burn rate across a range of different sized heaters or achieving a range of different burn rates within a single heater.

It is appreciated that various methods can be employed during the manufacturing process to ensure that the fuel composition blocks of the present invention are produced with a desired shaped block.

The mixture of the fuel composition that is formed from thermite, one or more binding agents and possibly, additional damping agents tends to have fluid consistency.

By way of an example the thermite, which is preferably provided in a granular form, can be mixed with a sodium silicate solution to form the fuel composition. The sodium silicate solution may preferably have water content in the region of 60-70%.

It is only once the mixture has been heated (or cooked) that the fuel composition takes on a more solid form; the heating preferably takes place in a suitable oven.

The process of making the fuel composition blocks employed in the present invention essentially involves the steps of:
Mixing the various ingredients (i.e. thermite, binding agent, damping agent) to produce the fuel composition;
Moulding the fuel composition in to the desired block shape(s);
Heating the moulded fuel composition to 'cook' the blocks so that they become solid.

It is appreciated that one way of ensuring that the fuel composition remains in the desired block shape throughout the manufacture process is to keep the fuel composition in a mould throughout the 'cooking' process. Once the blocks of fuel composition have been 'cooked', and have solidified, they can be removed from the moulds.

However, for practical reasons it is considered preferable, wherever possible, to avoid the use of mould during the 'cooking' step. To this end it is envisaged that the fuel composition mixture can be solidified prior to heating so that the blocks retain their shape without the need for a mould. This reduces the total number of mould required.

In cases where the fuel composition comprises sodium silicate, for example, one approach for solidifying the block shape prior to 'cooking' is to evenly distribute $CO_2$ through the mixture before the 'cooking' step. Subjecting the mixture to $CO_2$ in this way makes the blocks solid enough to be handled so that they can be placed in an oven without the need for a mould.

However, this approach is not considered ideal for achieving a uniform burn rate throughout the block. This is because as the $CO_2$ passes through the mixture it reacts with sodium silicate in the fuel composition and forms sodium dioxide, which acts as an accelerant, and sodium carbonate, which acts as a damping agent.

The essentially random nature with which the accelerant and damping agent are formed within the final fuel composition mixture prevents the production of blocks having a consistent and repeatable burn rate, which is undesirable.

It is also noted that if the fuel composition is exposed to too much $CO_2$ the blocks formed can become too brittle and fragile, which is also undesirable.

In view of the practical difficulties of both the above-described approaches for retaining the shape of the fuel composition blocks prior to 'cooking', a further approach was required. To this end the present invention provides an alternative solution.

A preferable method of maintaining the moulded shapes of the fuel composition blocks prior to 'cooking' involves freezing the blocks. It has been discovered that subjecting the blocks to temperatures in the range of between −20 to −80° C. causes the water present in fuel composition, an example of which would be the water present in the sodium silicate solution, to freeze and thereby solidify the entire block.

It is noted that when using temperatures towards the lower end of the above range to freeze the blocks the freezing process is carried out for a shorter period of time. At higher temperatures within the stated range the process can continue for longer.

This allows the blocks to be handled, removed from their moulds and placed into the oven.

Once in the oven, the blocks are heated at temperatures of about 250° C. for about 3 hours until the blocks are 'cooked' solid. However, the skilled person will appreciate that the blocks can be cooked at different temperatures and for different lengths of time without departing from the general concept of the present invention.

It was surprisingly discovered that the frozen blocks do not melt during the heating process but rather the water in the fuel composition blocks changes directly from a solid form to a vapour without triggering any chemical changes at all.

As a result, this alternative approach facilitates the formation of fuel composition blocks with highly uniform burn rates (unlike $CO_2$ formed blocks) without the need to keep the mixture in the mould until it has been 'cooked'. It will be appreciated from the above described features that the present invention allows the heating characteristics of a given heater to be predefined to suit the particular needs of any given down-hole task by effectively adjusting the arrangement blocks to achieve the most appropriate heat distribution pattern and then maintaining their relative positions during the burning process.

The method of manufacturing the fuel composition 'crumble' of the present invention will now be described with reference to FIG. 3, which shows a flow diagram of the key stages of the production process.

It will be appreciated that the initial steps of the 'crumble' manufacture process are essentially the same as those employed to produce the solid fuel composition blocks of the present invention; with the additional fragmentation stage being the main distinction. In view of this it is appreciated that the above description of the manufacture process for the blocks is also applicable to the method of manufacturing the fuel composition 'crumble'.

Referring now to FIG. 3, it can be seen that in the first stage of manufacture the various constituents of the fuel composition are mixed together in a mixing container 10.

The constituents shown are thermite 11, a binding agent such as sodium silicate 12, and a damping agent such as sand or magnesite 13.

For the sake of clarity the thermite is represented by the symbol '+', the binding agent is represented by the symbol '○', and the damping agent is represented by the symbol 'Δ' (i.e. a triangle).

During the mixing stage the various constituents are thoroughly blended to disperse them evenly throughout the mixture. It is appreciated that standard mixing equipment known in the art can be employed to achieve this.

Once the mixture has been suitably blended it is preferably placed in a mould 14 to shape the mixture. In the example shown in FIG. 3 the mould shapes the mixture into a sheet configuration, which is preferably between 2-40 mm thick. However it is envisaged that the mould may alternatively shape the mixture into a block shape. This would be the case for the solid fuel composition blocks of the present invention.

The shaped mixture is then subjected to heating temperatures of about 250° C. for around 3 hours so as to 'cook' the shaped mixture and form the solid shaped block or sheet (in the case of the 'crumble'). Once again it is appreciated that the 'cooking' temperature and 'cooking' time can be adjusted to suit the size of the shaped block or sheet that is being 'cooked'.

Again, as discussed above, it is contemplated that the shaped mixture can be cooked with or without the mould 14.

Once the solid fuel composition has been formed it can either be used directly as a chemical reaction heat source for a heater in its moulded shape (i.e. block) or it can be subjected to further processing to produce the fragmented solid fuel composition or 'crumble' of the present invention.

As represented diagrammatically in FIG. 3, the various constituents are evenly distributed throughout the moulded sheet of fuel composition 15. This even distribution is represented by the combined symbol formed from the +, ○, Δ. This even distribution would also be present in the fuel composition blocks formed by this process.

In order to produce the fuel composition 'crumble' the next stage is to subject the moulded sheet 15 to mechanical impacts to break the sheet up into smaller fragments 17, which preferably have a rough diameter in the range of 100 μm to 10 mm and further preferably between 500 μm to 6 mm.

It is appreciated that the size of the fragments will, to a certain extent, be dictated by how fine or coarse the thermite powder being used in the mixture is. In this regard it is noted that, because every fragment needs to have each of the constituents, using a coarser thermite powder increases the size of the thermite constituent, which in turn increases the overall size of the fragments.

In FIG. 3 the mechanical impact is shown as being delivered by a hammer 16. However it is envisaged that the fragmentation step can be carried out in a wide variety of ways provided they achieve a controlled and consistent fragmentation of the sheet 15.

Preferably the plurality of fragments 17 produced in a particular batch are roughly the same size so that their burn characteristics are consistent throughout the crumble 18.

In this regard, so that the burn characteristics of a particular batch are consistent the deviation of the fragment sizes within the batch is preferably limited to no more than about 20% either side of the mid-point. By way of an example, if the mid-point fragment size is 1 mm, the smallest fragments are 0.8 mm and the largest fragments are 1.2 mm.

In order to achieve this, the fragmented fuel composition is filtered/sieved to ensure all the fragments within a particular batch fall within a predetermined size range.

Although the preferred range of sizes of the fragments of the present invention is between 100 μm to 10 mm, it is appreciated that the size range within a particular batch may be narrower to ensure consistent burn characteristics of the fragments within the batch. Again this is achieved by filtering out larger fragments and smaller particles from the fragmented fuel composition.

It is appreciated that larger fragments, removed by the filtering step, may be subjected to further fragmentation before being reintroduced into the filtered mixture.

As will be appreciated from the diagrammatic representation shown in FIG. 3, the fragments 17 constitute 'reactive clusters' because they comprise all three constituents 11, 12, 13 as represented by the combined symbol formed from the +, ○, Δ.

As a result, even after the fragments 17 have disturbed (i.e. during transport), the fragments 17 burn with much more consistent burn characteristics that would be possible with a powdered fuel composition made from the similar constituents (e.g. thermite, damping agent).

In this way the fragments burn with greater consistency than powdered fuel compositions and greater flowability than fuel composition blocks.

As with the solid fuel composition blocks of the present invention, the fragments of the fuel composition 'crumble' can be placed within a heater body (not shown) and used as the chemical reaction heat source for the heater.

The invention claimed is:

1. A chemical reaction heat source for use in heaters for down-hole applications, said heat source having an inactive state and a reactive state, and having a solid fuel composition wherein the fuel composition comprises thermite and one or more binding agents that maintain the solid form of the solid fuel composition between said states wherein said solid fuel composition is provided in the form of a plurality of fragments, each of said fragments constitutes a reactive cluster that comprises various component parts of said fuel composition.

2. The chemical reaction heat source of claim 1 wherein said shaped mixture is broken into said plurality of fragments by applying impact force.

3. The chemical reaction heat source of claim 1 wherein said shaped mixture is mechanically chewed up into said plurality of fragments.

4. The chemical reaction heat source of any one of claims 1-3 wherein said solid fuel composition mixture further comprises one or more damping agents.

5. The chemical reaction heat source according to any one of claims 1-3 wherein said solid fuel composition mixture is shaped into a sheet having a thickness of between 2 mm and 40 mm.

6. The chemical reaction heat source according to any one of claims 1-3 wherein said fragments are filtered to ensure a predetermined range of fragment sizes.

7. The chemical reaction heat source of claim 6 wherein said fragments fall within a size range of 100 μm to 10 mm.

8. The heater for use in down-hole operations wherein a heat source of said heater comprises the chemical reaction heat source of any one of claims 1-7.

\* \* \* \* \*